US010231249B2

(12) United States Patent
Kang et al.

(10) Patent No.: US 10,231,249 B2
(45) Date of Patent: Mar. 12, 2019

(54) METHOD FOR TRANSMITTING SIGNAL THROUGH ENERGY EFFICIENCY OPTIMIZATION AND BASE STATION

(71) Applicants: LG ELECTRONICS INC., Seoul (KR); KOREA UNIVERSITY RESEARCH AND BUSINESS FOUNDATION, Seoul (KR)

(72) Inventors: Jiwon Kang, Seoul (KR); Inkyu Lee, Seoul (KR); Sangrim Lee, Seoul (KR)

(73) Assignees: LG Electronics Inc., Seoul (KR); Korea University Research and Business Foundation, Seoul (KR)

(*) Notice: Subject to any disclaimer, the term of this patent is extended or adjusted under 35 U.S.C. 154(b) by 121 days.

(21) Appl. No.: 15/314,437

(22) PCT Filed: Apr. 30, 2015

(86) PCT No.: PCT/KR2015/004418
§ 371 (c)(1),
(2) Date: Nov. 28, 2016

(87) PCT Pub. No.: WO2015/182890
PCT Pub. Date: Dec. 3, 2015

(65) Prior Publication Data
US 2017/0201999 A1 Jul. 13, 2017

Related U.S. Application Data
(60) Provisional application No. 62/004,197, filed on May 28, 2014.

(51) Int. Cl.
*H04L 27/00* (2006.01)
*H04W 72/08* (2009.01)
(Continued)

(52) U.S. Cl.
CPC ........ *H04W 72/085* (2013.01); *H04B 7/0456* (2013.01); *H04B 7/06* (2013.01);
(Continued)

(58) Field of Classification Search
CPC .. H04J 1/0004; H04L 5/0001; H04W 72/1268
See application file for complete search history.

(56) References Cited

U.S. PATENT DOCUMENTS 8,520,764 B2 * 8/2013 Khojastepour ...... H04B 7/0617
375/259
8,654,882 B2 * 2/2014 Lee ...................... H04B 7/0854
375/267
(Continued)

FOREIGN PATENT DOCUMENTS

WO 2014074894 5/2014

OTHER PUBLICATIONS

PCT International Application No. PCT/KR2015/004418, Written Opinion of the International Searching Authority dated Aug. 19, 2015, 16 pages.
(Continued)

*Primary Examiner* — Zhiren Qin
(74) *Attorney, Agent, or Firm* — Lee, Hong, Degerman, Kang & Waimey

(57) ABSTRACT

Disclosed is a signal transmission method. The signal transmission method includes the steps of: setting a default value for generating a beamforming vector to be used for precoding; performing a calculation process of an outer layer for determining whether an accuracy of an energy efficiency satisfies a first threshold value range during a dual layer calculation process for maximizing an energy efficiency of a base station; performing a calculation process of an inner layer for calculating a predetermined second threshold value on which deterministic equivalence of a channel gain matrix
(Continued)

coverage; generating a beamforming vector on the basis of values used in the calculation process of the outer layer and the calculation process of the inner layer, when the accuracy of the energy efficiency satisfies the first threshold value range in the calculation process of the outer layer; generating a transmission signal using the beamforming vector; and transmitting the generated transmission signal.

12 Claims, 7 Drawing Sheets

(51) Int. Cl.
*H04B 7/06* (2006.01)
*H04B 7/0456* (2017.01)
*H04L 5/00* (2006.01)

(52) U.S. Cl.
CPC .......... *H04B 7/0617* (2013.01); *H04L 5/006* (2013.01); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/444* (2018.01)

(56) References Cited

U.S. PATENT DOCUMENTS

| | | | | |
|---|---|---|---|---|
| 8,774,224 | B2* | 7/2014 | Lee | H04L 5/0023 |
| | | | | 370/480 |
| 8,867,495 | B2* | 10/2014 | Farajidana | H04B 7/0417 |
| | | | | 370/252 |
| 8,989,295 | B2* | 3/2015 | Skov | H04B 7/0486 |
| | | | | 375/259 |
| 2007/0195907 | A1 | 8/2007 | Wang et al. | |
| 2011/0150132 | A1 | 6/2011 | Kim et al. | |
| 2014/0119468 | A1 | 5/2014 | Huang et al. | |

OTHER PUBLICATIONS

Lee et al., "Two-cell MISO Interfering Broadcast Channel with Limited Feedback: Adaptive Feedback Strategy and Multiplexing Gains", Samsung Advanced Institute of Technoology (SAIT), Samsung Electronics Co., Ltd., IEEE ICC, Jun. 2011, 5 pages.

* cited by examiner

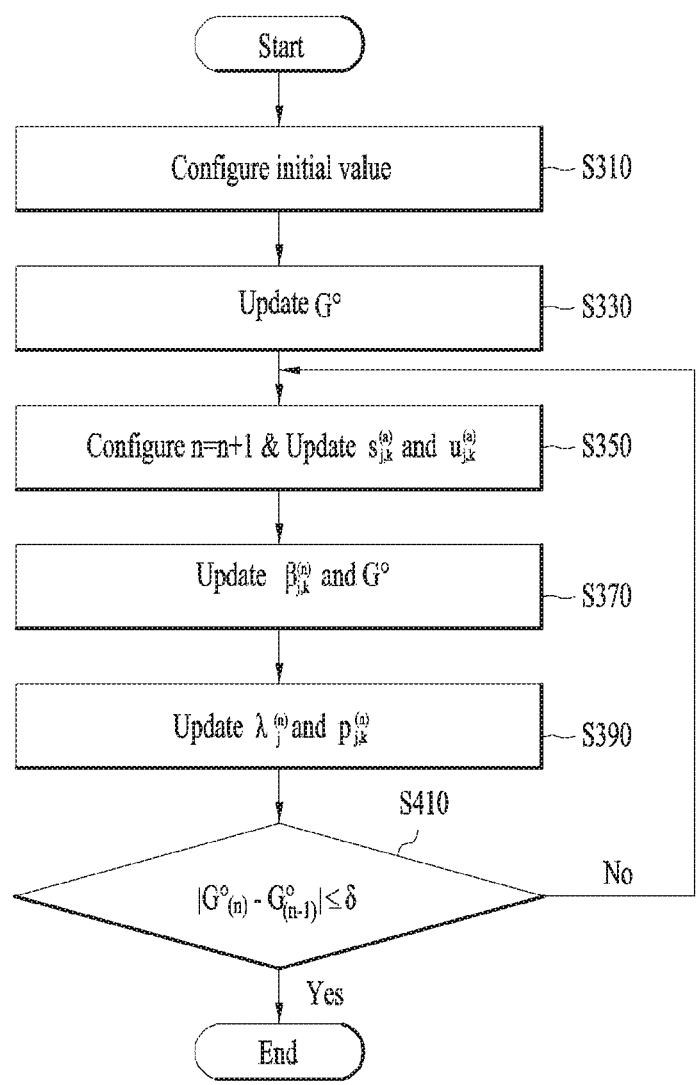

FIG. 4

SYSTEM SETUP

| System parameters | Value |
| --- | --- |
| The number of user drops | 10 |
| The number of channel realizations per user drop | 100 |
| The number of Tx antennas for each BS, N | 4 |
| Cell radius, R | 500m |
| Minimum distance from BS to each user, $R_{min}$ | 35m |
| Pass loss exponent, $\alpha$ | 3.8 |
| Transmit power constraint per BS, $P_j$ | 23 ~ 46 dBm |
| Circuit power per antenna, $P_c$ | 30 dBm |
| Basic power consumed at BS, $P_0$ | 40 dBm |
| Noise power, $\delta^2$ | -95 dBm |
| Inefficiency of the power amplifier, $\zeta$ | 2 |

(a)

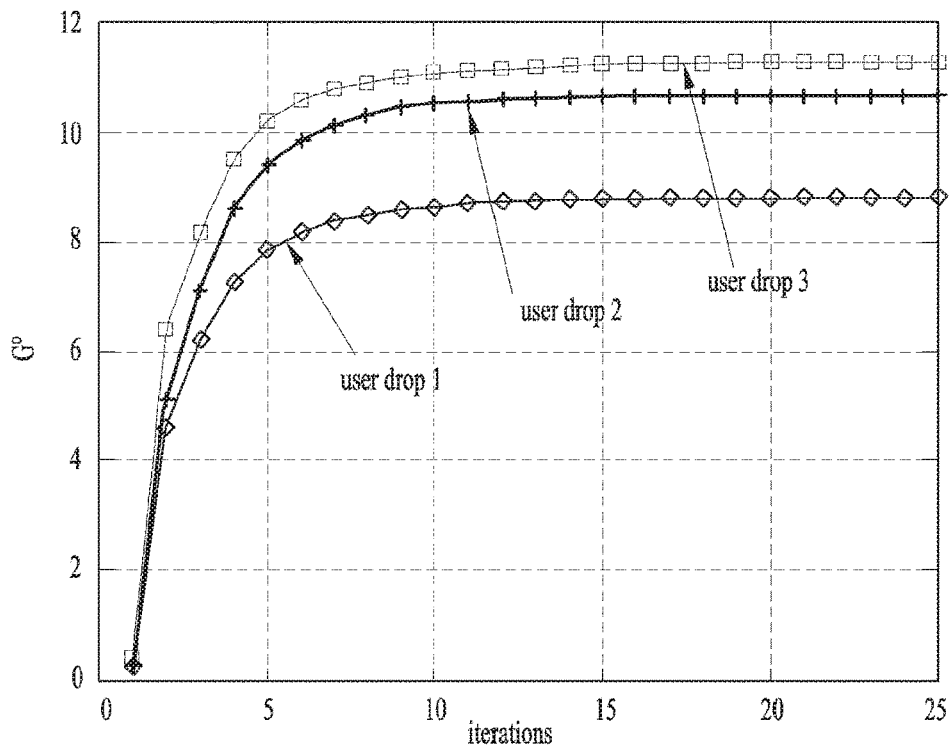

(b)

METHOD FOR TRANSMITTING SIGNAL THROUGH ENERGY EFFICIENCY OPTIMIZATION AND BASE STATION

CROSS-REFERENCE TO RELATED APPLICATIONS

This application is the National Stage filing under 35 U.S.C. 371 of International Application No. PCT/KR2015/004418, filed on Apr. 30, 2015, which claims the benefit of U.S. Provisional Application No. 62/004,197, filed on May 28, 2014, the contents of which are all hereby incorporated by reference herein in their entirety.

TECHNICAL FIELD

The present invention relates to a method for optimizing base station (BS) energy efficiency in a channel environment in which multi-user interference exists.

BACKGROUND ART

A conventional wireless network system has focused on maximization of spectrum efficiency so as to provide users with more improved services. Thus, since energy consumption of the system explosively increases, there is a need to develop a new system capable of enhancing efficiency of energy consumption and optimizing spectrum efficiency according to the environment problems.

Optimization of energy efficiency may be denoted by the ratio of an achievable sum rate to the total power consumption of the system. Energy efficiency optimization may be interpreted as the fractional programming issue for solving fractional problems, and unexpected problems may occur due to nonlinearity. Although the energy efficiency issue may be interpreted to be pseudo concave in an environment in which there is no multi-user interference, application of the above-mentioned method to be applied to a general situation in which multi-user interference exists is difficult.

Therefore, many developers and companies are conducting intensive research into various methods for optimizing energy efficiency in the multi-user interference situation. For example, a method for converting fractional programming indicating unique characteristics of the energy efficiency problem into the linear problem, and solving the energy efficiency problem has recently been proposed. However, in order to implement the above-mentioned solutions, all channel information and the additional information must be exchanged, and the algorithm must be repeatedly carried out according to a time-variant channel. Therefore, an improved method for optimizing energy efficiency is needed.

DISCLOSURE

Technical Problem

An object of the present invention is to provide a method for improving the efficiency of a precoding process for allowing a base station (BS) to generate a transmit (Tx) signal.

Another object of the present invention is to provide a method for forming a beamforming vector needed to optimize the energy efficiency in the BS.

Another object of the present invention is to provide a method for reducing calculation complexity and minimizing performance deterioration during the forming process of the beamforming vector.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting a signal by a base station (BS) including a plurality of antennas in a wireless communication system supporting Multiple Input Single Output (MISO), the method including: configuring an initial value for generating a beamforming vector to be used for precoding; performing an outer-layer calculation process to determine whether accuracy of energy efficiency calculated on the basis of the initial value satisfies a first threshold value range, during a dual-layer calculation process for maximizing energy efficiency of the BS; performing an inner-layer calculation process to calculate a second threshold value 90 to which deterministic equivalency of a channel gain matrix used in the calculation of the energy efficiency converges; if the energy efficiency accuracy determined on the basis of the inner-layer calculation process satisfies the first threshold value range used in the outer-layer calculation process, generating the beamforming vector on the basis of values used in the outer-layer calculation process and the inner-layer calculation process; generating a transmission signal by precoding data using the beamforming vector; and transmitting the generated transmission signal.

The method may further include: receiving a beamforming vector update request message requesting execution of a new precoding process from a user equipment (UE), wherein the configuring of the initial value includes configuring the initial value according to reception of the beamforming vector update request message.

The beamforming vector update request message may be received when second-order statistics of a channel measured by the UE are changed.

The case in which the second-order statistics are changed may include a case in which a covariance matrix of the channel is changed, a case in which a SINR (Signal to Interference plus Noise Ratio) measured by the UE is changed, or a case in which the UE moves by a predetermined distance or longer.

The first threshold value and the second threshold value may be determined by the BS, by a UE communicating with the BS, or by a user.

If the energy efficiency accuracy in the outer-layer calculation process does not satisfy the first threshold value range, the outer-layer calculation process or the inner layer calculation process may be repeatedly performed.

In accordance with another aspect of the present invention, a base station (BS) for transmitting a signal through a plurality of antennas in a wireless communication system supporting Multiple Input Single Output (MISO) includes: a transmitter; a receiver; and a processor connected to the transmitter and the receiver, and configured to perform signal transmission. The processor configures an initial value for generating a beamforming vector to be used for precoding, performs an outer-layer calculation process to determine whether accuracy of energy efficiency calculated on the basis of the initial value satisfies a first threshold value range during a dual-layer calculation process for maximizing energy efficiency of the base station (BS), performs an inner-layer calculation process to calculate a second threshold value onto which deterministic equivalency of a channel gain matrix used in the calculation of the energy efficiency converges, if the energy efficiency accuracy determined on the basis of the inner-layer calculation process satisfies the first threshold value range used in the outer-layer calculation process, generates the beamforming vector on the basis of values used in the outer-layer calculation process and the inner-layer calculation process, generates a transmission signal by precoding data using the beamforming vector, and transmits the generated transmission signal.

Advantageous Effects

As is apparent from the above description, the embodiments of the present invention may have the following effects according to the embodiments of the present invention.

First, the embodiments of the present invention can increase the efficiency of Tx signal creation by allowing the BS to improve calculation complexity of the precoding process.

Second, the embodiments of the present invention can maximize the energy efficiency because the beamforming vector formation process is optimized in the BS.

Third, the embodiments of the present invention can improve the energy efficiency, and can minimize performance deterioration.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 3 is a flowchart illustrating the other signal transmission method according to an embodiment of the present invention.

FIG. 4 illustrates improved effects obtained by the proposed signal transmission method.

BEST MODE

Figure 1:
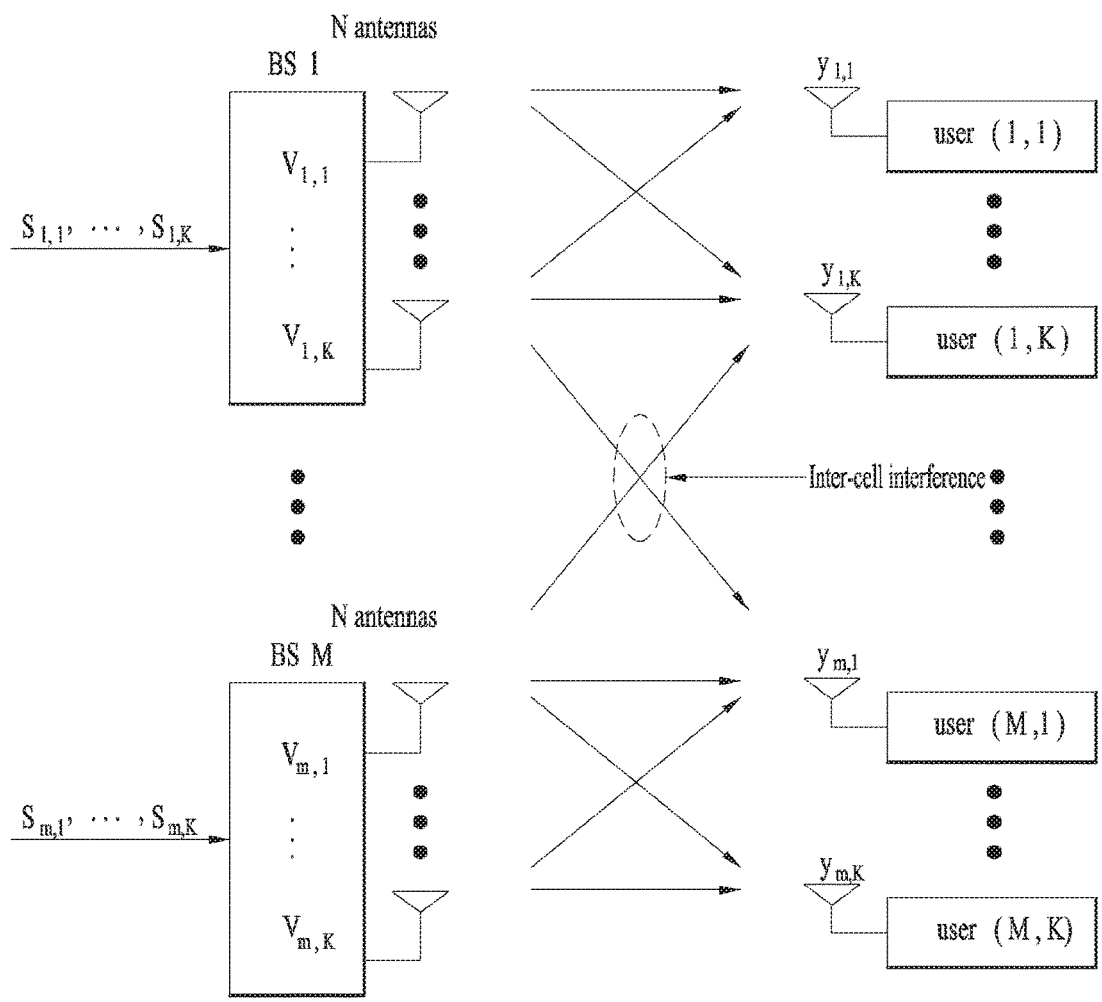
FIG. 1 is a conceptual diagram illustrating a MISO system.

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the drawings, procedures or steps which render the scope of the present invention unnecessarily ambiguous will be omitted and procedures or steps which can be understood by those skilled in the art will be omitted.

In the disclosure, 'include' or 'comprise' should be interpreted as that other components may further be included, not excluded, unless otherwise specified. It will be understood that when an element is referred to as being "connected to" or "coupled to" another element, the terms may include physical connection as well as physical connection and may also refer to logical connection. The term '-unit', '-or(er)', 'module', etc. signifies at least one function or operation processing unit that can be implemented in hardware, software, or a combination thereof. In addition, it is to be understood that the singular forms 'a, 'an', and 'the' include plural referents unless the context clearly dictates otherwise.

In the embodiments of the present invention, a description is made, centering on a data transmission and reception relationship between an BS and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point (AP)', etc. The term 'MS' may be replaced with the term 'User Equipment (UE)', 'Subscriber Station (SS)', 'Mobile Subscriber Station (MSS)', 'mobile terminal', 'terminal', etc.

The term "terminal" may also be replaced with the term user equipment (UE), mobile station (MS), subscriber station (SS), mobile subscriber station (MSS), mobile terminal or advanced mobile station (AMS) as necessary.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station (BS) becomes a transmitter.

The embodiments of the present invention are supported by standard documents disclosed in at least one of the Institute of Electrical and Electronic Engineers (IEEE) 802.xx system, the $3^{rd}$ generation partnership project (3GPP) system, the 3GPP LTE system and the 3GPP2 system, all of which are wireless access systems. In particular, the embodiments of the present invention are supported by the standard documents such as the 3GPP TS 36.211, TS 36.212, TS 36.213 and/or 3GPP TS 36.321, all of which are the standard documents of the 3GPP LTE system. That is, the steps or the portions of the embodiments of the present invention which are not described in order to clarify the technical spirit are supported by the above-described documents. All the terms disclosed in the present specification may be described by the above-described standard documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like.

CDMA may be embodied with radio technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with radio technology such as Institute of Electrical and Electronics Engineers (IEEE) 802.11 (Wi-Fi), IEEE 802.16 (WiMax), IEEE 802-21, and E-UTRA (Evolved UTRA).

The UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. For clarity, the following description focuses on 3GPP LTE and LTE-A. However, the present invention is applicable to an IEEE 802.16e/m system.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

FIG. 1 is a conceptual diagram illustrating a MISO system.

The present invention relates to a method for forming the beamforming vector to optimize the energy efficiency in a Multiple Input Single Output-InterFering Broadcast Channel (MISO-IFBC) system. The energy efficiency of the MISO-IFBC system may be denoted by a fractional problem, and may be interpreted to be non-convex due to interference influence, such that high complexity is needed to solve the above-mentioned issues. The iterative method based on the conventional instantaneous channel information so as to solve the energy efficiency problem must recognize information of all the channels, and may require high complexity due to execution of the algorithm based on per-channel information change, such that the iterative method has difficulty in acquiring insight into average performance (or throughput).

Therefore, the present invention provides a beamforming vector formation method acting as a method for optimizing the energy efficiency, such that the beamforming vector formation method greatly reduces complexity and causes little performance deterioration as compared to the conventional method. For this purpose, Tx power of the beam and the direction of beam may be constructed as parameters. According to the asymptotic irregular matrix theory, the beamforming vector can be calculated only using regional channel information. In addition, the result of parameters is not affected by the instantaneous channel change, and may be determined to be a value obtained by characteristics of second-order statistics of the channel. Therefore, differently from the conventional method in which the algorithm is performed whenever the instantaneous channel information is changed, the algorithm is performed only when the second-order statistics are changed according to the proposed method such that the improved effect can be obtained in terms of complexity. In addition, although the proposed algorithm has low complexity, the proposed algorithm is similar in performance (or throughput) to the conventional method, such that performance deterioration can be minimized.

Referring to FIG. 1, the proposed beamforming method assumes M-cell MISO-IFBC in which M base stations (BSs) having N antennas provide each BS with K single-antenna UEs. In the M-cell MISO-IFBC model of FIG. 1, UE(j,k) may denote a UE (k) serviced by the BS(j). When $h_{m,j,k}$ denotes a channel vector between the BS (m) and the UE (j,k), the signal ($y_{j,k}$) received by the UE (j,k) may be represented by the following equation 1.

$$y_{j,k} = h_{j,j,k}^H v_{j,k} s_{j,k} + \sum_{(m,n) \neq (j,k)} h_{m,j,k}^H v_{m,n} s_{m,n} + n_{j,k} \quad \text{[Equation 1]}$$

In Equation 1, $v_{m,n}$ and $n_{j,k}$ may respectively denote the beamforming vector and noise for the UE(m,n). $S_{m,n}$ may denote a desired signal. In this case, the sum rate $R_{j,k}(\{v_{m,n}\})$ of the UE(j,k) with respect to the given beamforming vectors $\{v_{m,n}\}$ may be represented by the following equation 2.

$$R_{j,k}(\{v_{m,n}\}) = \log_2(1 + \text{sinr}_{j,k}(\{v_{m,n}\})) \quad \text{[Equation 2]}$$

In Equation 2, $\text{sinr}_{j,k}$ may denote a SINR (Signal to Interference plus Noise Ratio) of the UE(j,k), and may be represented by the following equation 3.

$$\text{sinr}_{j,k}(\{v_{m,n}\}) = \frac{|h_{j,j,k}^H v_{j,k}|^2}{\sum_{(m,n) \neq (j,k)} |h_{m,j,k}^H v_{m,n}|^2 + \sigma^2} \quad \text{[Equation 3]}$$

In Equation 3, $\sigma^2$ may denote noise variance. Meanwhile, the total sum of power consumption of the M-cell MISO-IFBC system shown in FIG. 1 may be represented by the following equation 4.

$$P_T = \zeta \sum_{j,k} \|v_{j,k}\|^2 + MNP_c + MP_0 \quad \text{[Equation 4]}$$

In Equation 4, $\zeta$ may denote a positive(+) constant associated with inefficiency of the power amplifier, $P_c$ may denote power fixedly consumed by the circuit, and $P_0$ may denote power fixedly consumed by the base station (BS). The energy efficiency (EE) defined as a specific value obtained when the weighted sum rate (WSR) based on Equation 2 is divided by the total sum of power consumption based on Equation 4 may be represented by the following equation 5.

$$EE = \frac{f_1(\{v_{j,k}\})}{f_2(\{v_{j,k}\})} = \frac{\sum_{j,k} w_{j,k} R_{j,k}}{\zeta \sum_{j,k} \|v_{j,k}\|^2 + MNP_c + MP_0}$$ [Equation 5]

In Equation 5, $w_{j,k}$ may be a positive(+) number decided by Quality of Service (QoS) and scheduling. The issue for maximizing the energy efficiency in the M-cell MISO-IFBC model using the above concept may be represented by the following equation 6.

$$\max_{\{v_{j,k}\}} \frac{f_1(\{v_{j,k}\})}{f_2(\{v_{j,k}\})} \text{ s.t. } \sum_{k=1}^{K} \|v_{j,k}\|^2 \leq P_j \text{ for } j = 1, \ldots, M.$$ [Equation 6]

In Equation 6, $P_j$ may denote the maximum power of the BS(j). That is, the solution of the above problem is to calculate the beamforming vector configured to maximize the energy efficiency within the maximum power of the BS. The present invention provides the beamforming vector formation method based on the asymptotic irregular matrix theory. Here, the beamforming vector formation method may greatly reduce calculation complexity as compared to the conventional energy efficiency maximization method, and may minimize performance deterioration.

Figure 2:
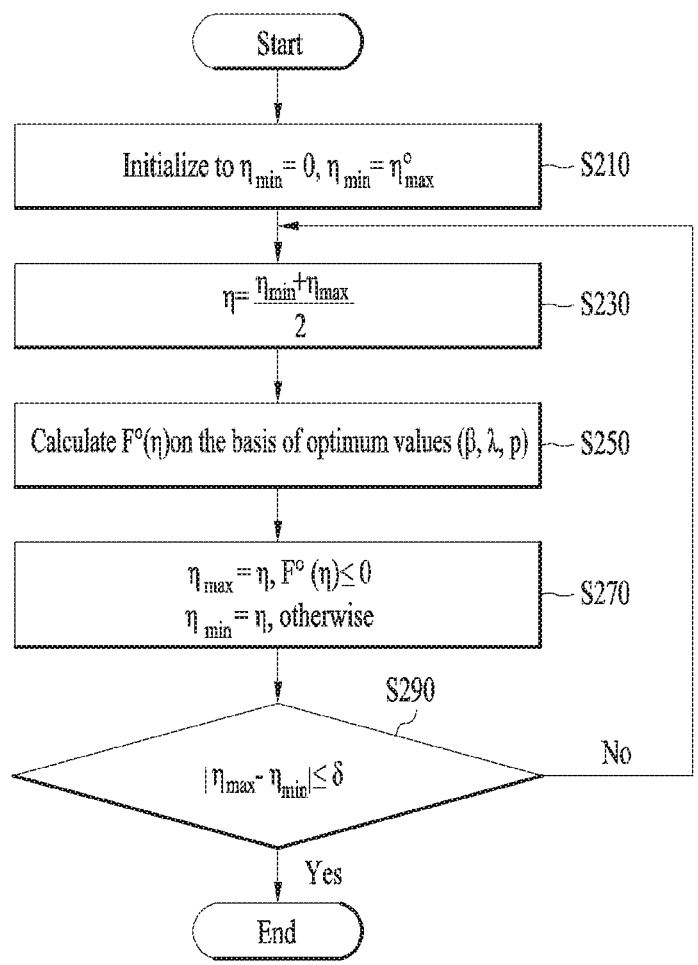
FIG. 2 is a flowchart illustrating a signal transmission method according to an embodiment of the present invention.

FIGS. 2 and 3 are flowcharts illustrating the signal transmission method according to the embodiment of the present invention.

First, the conventional energy efficiency maximization method will hereinafter be given. In association with the method for maximizing the energy efficiency in the conventional M-cell MISO-IFBC model, a double-layered optimization method for performing optimization in different ways according to the outer layer and the inner layer has already been proposed. The energy efficiency maximization problem in the M-cell IFBC model may be represented by the parametric programming of the following equation 7.

$$\max_{\{v_{j,k}\}, \eta \in R} \eta$$ [Equation 7]

$$\text{s.t. } f_1(\{v_{j,k}\}) - \eta f_2(\{v_{j,k}\}) \geq 0$$

$$\sum_{k=1}^{K} \|v_{j,k}\|^2 \leq P_j \text{ for } j = 1, \ldots, M$$

In Equation 7, the value (or solution) of the parametric programming may exist only when the optimization problem of the following equation 8 has an optimal objective function instead of a negative value.

$$\max_{\{v_{j,k}\}} f_1(\{v_{j,k}\}) - \eta f_2(\{v_{j,k}\})$$ [Equation 8]

$$\text{s.t.} \sum_{k=1}^{K} \|v_{j,k}\|^2 \leq P_j \text{ for } j = 1, \ldots, M$$

Assuming that the optimal objective function for the optimization problem shown in Equation 8 is denoted by $F(\eta)$, $F(\eta)$ may monotonically decrease with respect to $\eta$, $\eta$ may denote the maximum energy efficiency at $F(\eta)=0$. Therefore, the outer layer of the conventional double-layered optimization method may be calculated by applying a bisection method to the above value of $\eta$ at $F(\eta)=0$.

Meanwhile, the inner layer of the dual-layer optimization method may calculate the solution of the $F(\eta)$ maximization problem with respect to the given value of $\eta$. The abovementioned problem may be modified into the problem equivalent to Equation 9 according to the relationship between the weighted sum rate (WSR) and the Weighted Minimum Mean Square Error (WMMSE).

$$\min_{\{v_{j,k}\},\{u_{j,k}\},\{s_{j,k}\}} \sum_{j,k} w_{j,k}(e_{j,k} s_{j,k} - \log_2 s_{j,k} - 1) + \eta \zeta \|v_{j,k}\|^2$$ [Equation 9]

$$\text{s.t. } \sum_{k=1}^{K} \|v_{j,k}\|^2 \leq P_j \; \forall \; j$$

In Equation 9, $S_{j,k}$ and $u_{j,k}$ may be dummy variables, and $e_{j,k}$ may be a Mean Square Error (MSE) as represented by the following equation 10.

$$e_{j,k} = |u_{j,k} h_{j,j,k}^H v_{j,k} - 1|^2 + \sum_{(m,n) \neq (j,k)} |u_{j,k} h_{m,jk}^H v_{m,n}|^2 + |u_{j,k}|^2 \sigma^2$$ [Equation 10]

The optimal values $s_{j,k}$ and $u_{j,k}$ for the given value $\{v_{j,k}\}$ shown in Equation 10 may be represented by the following equation 11.

$$s_{j,k}^{opt,\eta} = (1 - u_{j,k} v_{j,j,k}^H h_{j,j,k})^{-1}$$ [Equation 11]

$$u_{j,k}^{opt,\eta} = \frac{h_{j,j,k}^H v_{j,k}}{\sum_{m,n} |h_{m,j,k}^H v_{m,n}|^2 + \sigma^2}$$

In addition, $v_{j,k}$ to satisfy the first-order optimal condition with respect to the given values $\{s_{j,k}\}$ and $\{u_{j,k}\}$ may be represented by the following equation 12.

$$v_{j,k}^{opt,\eta} = w_{j,k} s_{j,k} u_{j,k} \left( \sum_{m,n} \frac{w_{m,n} s_{m,n} |u_{m,n}|^2 h_{j,m,n} h_{j,m,n}^H +}{(\eta \zeta + \mu_j) I} \right)^{-1} h_{j,j,k}$$ [Equation 12]

In Equation 12, $\mu_j$ may denote Lagrange multiplier. In association with the optimal value of $\mu_j$, assuming that $\mu_j=0$ satisfies $$\sum_{k=1}^{K} \|v_{j,k}\|^2 \le P_j, \mu_j^{opt,\eta} = 0$$

may be calculated. Assuming that $\mu_j=0$ does not satisfy $$\sum_{k=1}^{K} \|v_{j,k}\|^2 \le P_j,$$

$\mu_j$ satisfying $$\sum_{k=1}^{K} \|v_{j,k}\|^2 = P_j$$

using the bisection method may be calculated as the optimal value of $\mu_j$. In conclusion, $\{s_{j,k}^{opt,\eta}\}$, $\{u_{j,k}^{opt,\eta}\}$ and $\{v_{j,k}^{opt,\eta}\}$ are alternately updated so that the problem of the inner layer can be optimized.

Subsequently, the energy efficiency maximization method according to the present invention will hereinafter be described. The proposed method is to maximize the energy efficiency on the basis of the analysis result obtained when the asymptotic irregular matrix theory is applied to the M-cell MISO-IFBC model. Firstly, the normalized beamforming vector based on the conventional beamforming vector structure may be represented by the following equation 13.

$$\overline{v}_{j,k} = c_{j,k} \left( \sum_{(m,n)} \beta_{m,n} h_{j,m,n} h_{j,m,n}^H + \lambda_j I \right)^{-1} h_{j,j,k} \quad \text{[Equation 13]}$$

In Equation 13, $\beta_{m,n}$, $\lambda_j$, and $c_{j,k}$ may be represented by the following equation 14.

$$\beta_{m,n} = w_{m,n} s_{m,n} |u_{m,n}|^2 \quad \text{[Equation 14]}$$

$$\lambda_j = \eta \zeta + \mu_j$$

$$c_{j,k} = \frac{1}{\left\| \left( \sum_{(m,n)} \beta_{m,n} h_{j,m,n} h_{j,m,n}^H \right)^{-1} h_{j,j,k} \right\|}$$

Therefore, the normalized channel gain matrix concept may be applied to the given value $\{\overline{v}_{j,k}\}$, and the channel gain matrix $\mathcal{G}$ may be represented by the following equation 15.

$$\mathcal{G} = \begin{bmatrix} |h_{1,1,1}^H \overline{v}_{1,1}|^2 & |h_{1,1,2}^H \overline{v}_{1,1}|^2 & \cdots & |h_{1,M,K}^H \overline{v}_{1,1}|^2 \\ |h_{1,1,1}^H \overline{v}_{1,2}|^2 & |h_{1,1,2}^H \overline{v}_{1,2}|^2 & \cdots & |h_{1,M,K}^H \overline{v}_{1,2}|^2 \\ \vdots & \vdots & \ddots & \vdots \\ |h_{M,1,1}^H \overline{v}_{M,K}|^2 & |h_{M,1,2}^H \overline{v}_{M,K}|^2 & \cdots & |h_{M,M,K}^H \overline{v}_{M,K}|^2 \end{bmatrix} \in \mathbb{R}^{MK \times MK} \quad \text{[Equation 15]}$$

In Equation 15, the element $((j-1)\times K+k, (m-1)\times K+n)$ of the matrix $\mathcal{G}$ may denote the intensity of a signal transmitted from the UE(m,n) when the BS j provides the UE(j,k) with necessary services. In accordance with the result of the irregular matrix theory, if N (=the number of BSs) increases in association with K/N, $\mathcal{G}$ may be almost surely convergence into the deterministic equivalent matrix $\mathcal{G}^o$, and may be represented by the following equation 16. Assuming that $\mathcal{G}^o$ is almost surely converged, this means any one of criteria indicating the degree of convergence, such that $\mathcal{G}^o$ is absolutely converted into a predetermined bound.

$$\mathcal{G}^o = \begin{bmatrix} D_{1,1}^o & I_{1,1,1,2}^o & \cdots & I_{1,1,M,K}^o \\ I_{1,2,1,1}^o & D_{1,2}^o & \cdots & I_{1,2,M,K}^o \\ \vdots & \vdots & \ddots & \vdots \\ I_{M,K,1,1}^o & I_{M,K,1,2}^o & \cdots & D_{M,K}^o \end{bmatrix} \in \mathbb{R}^{MK \times MK} \quad \text{[Equation 18]}$$

In Equation 16, $D_{j,k}^o$ and $I_{j,k,m,n}^o$ may be represented by the following equation 17.

$$D_{j,k}^o = \frac{(m_{j,k}^o)^2}{N \Psi_{j,k}^o}, \quad \text{[Equation 17]}$$

$$I_{j,k,m,n}^o = \frac{\Psi_{j,k,m,n}^o}{(1 + \beta_{m,n} m_{j,k,m,n}^o) \Psi_{j,k}^o}$$

In Equation 17, the respective variables constructing $D_{j,k}^o$ may be represented by the following equation 18.

$$m_{j,k}^o = \varepsilon_{j,j,k} \phi \left( \mathcal{L}_{jk}, \frac{\lambda_j}{N} \right) \quad \text{[Equation 18]}$$

$$\Psi_{j,k}^o = \varepsilon_{j,j,k} \phi' \left( \mathcal{L}_{jk}, \frac{\lambda_j}{N} \right)$$

$$\mathcal{L}_j = \{ \varepsilon_{j,1,1} \beta_{1,1}, \varepsilon_{j,1,2} \beta_{1,2}, \ldots \varepsilon_{j,M,K} \beta_{M,K} \}$$

$$\mathcal{L}_{jk} = \mathcal{L}_j \setminus \{ \varepsilon_{j,j,k} \beta_{j,k} \}$$

$$\phi(S, \rho) = \frac{1}{\frac{1}{N} \sum_{s_i \in S} \frac{s_i}{1 + e_i} + \rho}$$

$$e_i = \frac{s_i}{\frac{1}{N} \sum_{s_i \in S} \frac{s_i}{1 + e_i} + \rho}$$

$$\phi'(S, \rho) = \left( 1 + \frac{1}{N} \sum_{s_i \in S} \frac{s_i e_i'}{1 + e_i} \right) \phi(S, \rho)^2$$

$$e' = [e_1' \ \ldots \ e_{|S|}']^T = (I_{|S|} - J)^{-1} v$$

$$[J]_{i,j} = \frac{s_i s_j}{N(1 + e_j)^2} \phi(S, \rho)^2 \text{ for } i, j = 1, \ldots, |S|$$

$$v = [s_1 \phi(S, \rho)^2, \ldots, s_{|S|} \phi(S, \rho)^2]^T$$

In Equation 18, $|S|$ may denote the number of elements of the set (or aggregate) $S$.

Likewise, the respective variables constructing $I_{j,k,m,n}^o$ of Equation 17 may be represented by the following equation 19.

$$m_{j,k,m,n}^o = \varepsilon_{j,m,n} \phi \left( \mathcal{L}_{jkmn}, \frac{\lambda_j}{N} \right) \quad \text{[Equation 9]}$$

$$\Psi_{j,k,m,n}^o = \varepsilon_{j,j,k} \varepsilon_{j,m,n} \phi' \left( \mathcal{L}_{jkmn}, \frac{\lambda_j}{N} \right)$$

-continued
$$\mathcal{L}_{jkmn} = \mathcal{L}_{jk} \setminus \{\varepsilon_{j,m,n}\beta_{m,n}\}$$

Demonstration of Equations 16 to 19 is as follows. A diagonal term of Equation 16 may denote a desired signal, and this diagonal term $|h_{j,j,k}^H \overline{v}_{j,k}|^2$ may be represented by the following equation 20.

$$|h_{j,j,k}^H \overline{v}_{j,k}|^2 = \frac{|h_{j,j,k}^H (A_j + \lambda_j I)^{-1} h_{j,j,k}|^2}{\|(A_j + \lambda_j I)^{-1} h_{j,j,k}\|^2}$$ [Equation 20]

$$= \frac{|h_{j,j,k}^H (A_j + \lambda_j I)^{-1} h_{j,j,k}|^2}{h_{j,j,k}^H (A_j + \lambda_j I)^{-2} h_{j,j,k}}$$

$$= \frac{|h_{j,j,k}^H (A_j + \lambda_j I)^{-1} h_{j,j,k}|^2}{h_{j,j,k}^H (A_j + \lambda_j I)^{-2} h_{j,j,k}}$$

In Equation 20, and $A_j = \Sigma_{(m,n)} \beta_{m,n} h_{j,m,n} h_{j,m,n}^H$ and $A_{jk} = \Sigma_{(m,n) \neq (j,k)} \beta_{m,n} h_{j,m,n} h_{j,m,n}^H$ may be established or configured. The last equation of Equation 20 may be derived from the Sherman-Morrison inverse matrix theory. In $|h_{j,j,k}^H \overline{v}_{j,k}|^2$ shown in Equation 20, a numerator component may be represented by the following equation 21 according to the Couillet theory.

$$h_{j,j,k}^H (A_{jk} + \lambda_j I)^{-1} h_{j,j,k} - \frac{\varepsilon_{j,j,k}}{N} tr \sum_{jk} \xrightarrow{a.s.} 0$$ [Equation 21]

In Equation 21, 'tr' may denote a trace corresponding to the sum of diagonal terms of the matrix, and 'as.' may indicate the state of almost-sure convergence onto zero (0). Meanwhile, as shown in Equation 21, $$\sum_{jk} = \sum_{(m,n) \neq (j,k)} \beta_{m,n} h_{j,m,n} h_{j,m,n}^H + \frac{\lambda_j}{N} I$$

is given. Equation 21 may also be represented by the following equation 22 according to the Wagner theory.

$$h_{j,j,k}^H (A_{jk} + \lambda_j I)^{-1} h_{j,j,k} - m_{j,k}^o \xrightarrow{a.s.} 0$$ [Equation 22]

Likewise, assuming that the Couillet theory and the Wagner theory are applied to the denominator component of $|h_{j,j,k}^H \overline{v}_{j,k}|^2$ in Equation 20, the resultant value may be represented by the following equation 23.

$$h_{j,j,k}^H (A_{jk} + \lambda_j I)^{-2} h_{j,j,k} - \frac{1}{N} \Psi_{j,k}^o \xrightarrow{a.s.} 0$$ [Equation 23]

The off-diagonal term of Equation 15 may denote the interference signal, and the off-diagonal term $|h_{j,m,n}^H \overline{v}_{j,k}|^2$ may be represented by the following equation 24.

$$|h_{j,m,n}^H \overline{v}_{j,k}|^2 = \frac{|h_{j,m,n}^H (A_j + \lambda_j I)^{-1} h_{j,j,k}|^2}{\|(A_j + \lambda_j I)^{-1} h_{j,j,k}\|^2}$$ [Equation 24]

$$= \frac{h_{j,m,n}^H (A_{jk} + \lambda_j I)^{-1} h_{j,j,k} h_{j,j,k}^H (A_{jk} + \lambda_j I^{-1}) h_{j,m,n}}{h_{j,j,k}^H (A_{jk} + \lambda_j I)^{-2} h_{j,j,k}}$$

$$= \frac{\frac{h_{j,m,n}^H (A_{jkmn} + \lambda_j I)^{-1} h_{j,j,k} h_{j,j,k}^H}{(A_{jkmn} + \lambda_j I)^{-1} h_{j,m,n}}}{(1 + \beta_{m,n} h_{j,m,n}^H (A_{jkmn} + \lambda_j I)^{-1} h_{j,m,n})^2}$$
$$(h_{j,j,k}^H (A_{jk} + \lambda_j I)^{-2} h_{j,j,k})$$

In Equation 24, $A_{jkmn} = \Sigma_{(i,q) \neq (j,k),(m,n)} \beta_{i,q} h_{j,i,q} h_{j,i,q}^H$ may be established or configured. The second equation and the third equation may be derived according to Sherman-Morrison inverse matrix theory. Assuming Couillet theory is applied twice to the numerator of $|h_{j,m,n}^H \overline{v}_{j,k}|^2$ of Equation 24, the result value may be represented by the following equation 25.

$$h_{j,m,n}^H (A_{jkmn} + \lambda_j I)^{-1} h_{j,j,k} h_{j,j,k}^H (A_{jkmn} + \lambda_j I)^{-1} h_{j,m,n} -$$ [Equation 25]
$$\frac{\varepsilon_{j,j,k} \varepsilon_{j,m,n}}{N^2} tr \sum_{jkmn}^2 \xrightarrow{a.s.} 0$$

In Equation 25, $$\sum_{jkmn} = \left( \sum_{(i,q) \neq (j,k),(m,n)} \beta_{i,q} h_{j,i,q} h_{j,i,q}^H + \frac{\lambda_j}{N} I \right)^{-1}$$

may be established or configured. Equation 26 may be derived from Equation 25 according to the Wagner theory.

$$\frac{\varepsilon_{j,j,k} \varepsilon_{j,m,n}}{N^2} tr \sum_{jkmn}^2 - \frac{1}{N} \Psi_{j,k,m,n}^o \xrightarrow{a.s.} 0$$ [Equation 26]

The final result acquired from the denominator component of $|h_{j,m,n}^H \overline{v}_{j,k}|^2$ according to the similar derivation process may be represented by the following equation 27.

$$|h_{j,m,n}^H \overline{v}_{j,k}|^2 - \frac{\Psi_{j,k,m,n}^o}{(1 + \beta_{m,n} m_{j,k,m,n}^o)^2 \Psi_{j,k}^o} \xrightarrow{a.s.} 0$$ [Equation 27]

In conclusion, the deterministic equivalency of SINR of the UE (j,k) may be derived through $\mathcal{G}$, and may be represented by the following equation 28.

$$sinr_{j,k}^o = \frac{g_{j,k,j,k}^o p_{j,k}}{\sum_{(m,n) \neq (j,k)} g_{m,n,j,k}^o p_{m,n} + \sigma^2}$$ [Equation 28]

In Equation 28, $g_{m,n,j,k}^o$ may be (m×n,j×k) elements of $\mathcal{G}$, and $p_{m,n}$ may be power allocated to the UE(m,n). The left part of the denominator of Equation 28 may denote interference influence, and the right part of the denominator may denote noise influence.

In this case, assuming that the deterministic equivalency of the WST and the energy efficiency is numerically expressed according to the SINR deterministic equivalency, the result may be represented by the following equation 29.

$$R_\Sigma^o = \sum_{j,k} w_{j,k} \log_2\left(1 + \frac{g_{j,k,j,k}^o p_{j,k}}{\sum_{(m,n)\neq(j,k)} g_{m,n,j,k}^o p_{m,n} + \sigma^2}\right) \quad \text{[Equation 29]}$$

$$\eta^o = \frac{R_\Sigma^o}{\zeta \sum_{j,k} p_{j,k} + MNP_c + MP_0}.$$

Therefore, the maximization of the deterministic equivalency of the energy efficiency may be represented by the following equation 30.

$$\max_{\{p_{j,k}\},\{\beta_{j,k}\},\{\lambda_j\}} \eta^o \quad \text{[Equation 30]}$$

$$\text{s.t.} \sum_{k=1}^{K} p_{j,k} \leq P_j \text{ for } j=1,\ldots,M$$

In Equation 30, the solution can be acquired through the above double-layered optimization method. The above solution may only exist when the optimization problem of Equation 31 has an optimal objective function instead of the negative value.

$$\max_{\{p_{j,k}\},\{\beta_{j,k}\},\{\lambda_j\}} R_\Sigma^o - \eta^o\left(\zeta \sum_{j,k} p_{j,k} + \sum_j (NP_c + P_0)\right) \quad \text{[Equation 31]}$$

$$\text{s.t.} \sum_{k=1}^{K} p_{j,k} \leq P_j \text{ for } j=1,\ldots,M$$

Assuming that the optimal objective function of Equation 31 is denoted by $F^o(\eta^o)$, $F^o(\eta^o)$ may monotonically decrease with respect to $\eta^o$. In addition, the deterministic equivalency of the energy efficiency may be maximized at $F^o(\eta^o)=0$. Therefore, according to the double-layered optimization method, $\eta^o$ obtained at $F^o(\eta^o)=0$ in the outer layer may be calculated using the bisection method. In the inner layer, the solution of the above-mentioned optimization problem can be derived. If Couillet theory is applied to the upper limit value of $\eta^o$ used in the bisection method, the resultant value may be represented by the following equation 32.

$$\eta_{max}^o = \frac{\sum_{j,k} \log_2\left(1 + \frac{P_j N}{\sigma^2}\right)}{\sum_j (NP_c + P_0)} \quad \text{[Equation 32]}$$

Meanwhile, the optimization problem of Equation 31 may be modified into the following equation 33 according to the relationship between WSR and WMMSE.

$$\max_{\{p_{j,k}\},\{\beta_{j,k}\},\{\lambda_j\},\{u_{j,k}\},\{s_{j,k}\}} \sum_{j,k}\left(w_{j,k}\left(\frac{e_{j,k} - }{\log_2 s_{j,k}} - 1\right) + \eta\zeta p_{j,k}\right) \quad \text{[Equation 33]}$$

$$\text{s.t.} \sum_{k=1}^{K} p_{j,k} \leq P_j \forall \ j$$

In Equation 33, $$e_{j,k} = \left(u_{j,k}\sqrt{g_{j,k,j,k}^o p_{j,k}} - 1\right)^2 + \sum_{(m,n)\neq(j,k)} u_{j,k}^2 g_{m,n,j,k}^o p_{m,n} + u_{j,k}^2 \sigma^2$$

may be given. In association with the given values $\{p_{j,k}\}$, $\{\beta_{j,k}\}$, $\{\lambda_j\}$, the optimal values $s_{j,k}$ and $u_{j,k}$ in Equation 33 may be represented by the following equation 34.

$$s_{j,k}^{opt} = \left(1 - u_{j,k}\sqrt{g_{j,k,j,k}^o p_{j,k}}\right)^{-1} \quad \text{[Equation 34]}$$

$$u_{j,k}^{opt} = \frac{\sqrt{g_{j,k,j,k}^o p_{j,k}}}{\sum_{m,n} g_{m,n,j,k}^o p_{m,n} + \sigma^2}$$

The optimal value $\beta_{j,k}$ may be calculated using $\beta_{m,n} = w_{m,n} s_{m,n} |u_{m,n}|^2$, such that $\mathcal{G}$ may be newly obtained according to the calculation result. The optimal value $p_{j,k}$ with respect to the given values $\{s_{j,k}\}$ and $\{_{j,k}\}$ may be represented by the following equation 35.

$$p_{j,k}^{opt} = \frac{w_{j,k} s_{j,k} u_{j,k} \sqrt{g_{j,k,j,k}^o}}{\sum_{m,n} w_{m,n} s_{m,n} u_{m,n}^2 g_{j,k,m,n}^o + \lambda_j^{opt}} \quad \text{[Equation 35]}$$

In Equation 35, $\lambda_j^{opt}$ may be decided by $\lambda_j = \eta\zeta + \mu_j$. If $\mu_j = 0$ satisfies $\Sigma_{k=1}^K p_{j,k} \leq P_j$, $\mu_j^{opt}$ may be set to $\mu_j^{opt} = 0$. If $\mu_j = 0$ does not satisfy $\Sigma_{k=1}^K p_{j,k} \leq P_j$, $\mu_j$ satisfying $\Sigma_{k=1}^K p_{j,k} = P_j$ may be decided according to the bisection method, such that $\mu_j^{opt}$ may be established or configured.

In conclusion, $\{s_{j,k}^{opt}\}$, $\{u_{j,k}^{opt}\}$, $\{\beta_{j,k}^{opt}\}$ may be calculated so that $\mathcal{G}^o$ is updated, $\{p_{j,k}^{opt}\}$, $\{\lambda_j^{opt}\}$ may be alternately updated on the basis of the above-mentioned result, so that the inner layer problem can be optimized.

The algorithm for maximizing the deterministic equivalency of the energy efficiency is shown in FIGS. 2 and 3. FIG. 2 illustrates the calculation process for the outer layer in the double-layered optimization method, and FIG. 3 illustrates the calculation process for the inner layer in the double-layered optimization method.

Firstly, FIG. 2 illustrates the outer-layer calculation process corresponding to some parts of the beamforming vector formation process used when the BS acquires the optimal energy efficiency. The BS may configure the initial value for calculating the efficiency, and may perform initialization to $\eta_{min} = 0$ and $\eta_{max} = \eta_{max}^o$ (S210). In step S210, as shown in Equation 32, $$\eta_{max}^o = \frac{\sum_{j,k} \log_2\left(1 + \frac{P_j N}{\sigma^2}\right)}{\sum_j (NP_c + P_0)}$$

may be defined.

Subsequently, the BS may configure $$\eta = \frac{\eta_{min} + \eta_{max}}{2}$$

using the initial value of step S210 (S230). If $\eta$ is decided, $F^o(\eta)$ may be calculated on the basis of the optimal values $\{p_{j,k}^{opt,n}\} \cdot \{\beta_{j,k}^{opt,n}\}$, $\{\lambda_j^{opt,n}\}$ calculated on the basis of the decided value, $\eta$ (S250). A detailed process for calculating the optimum values $\{p_{j,k}^{opt,n}\} \cdot \{\beta_{j,k}^{opt,n}\}$, $\{\lambda_j^{opt,n}\}$ may be carried out by the inner-layer calculation process, and a detailed description thereof will be given with reference to FIG. 3.

If the calculated $F^o(\eta)$ satisfies $F^o(\eta) \leq 0$, the BS may change the initial value calculated at S210 so that $\eta_{max} = \eta$ may be established or configured. Otherwise, $\eta_{min} = \eta$ may be established or configured (S270). In other words, the initial value to be used at steps S230 to S250 may be newly established or configured according to the $F^o(\eta)$ calculation result (S270). If $F^o(\eta) \leq 0$ is satisfied, $\eta$ at step S230 may be determined to be a new upper limit (or new upper bound) value of $F^o(\eta)$. Otherwise, $\eta$ at step S230 may be determined to be a new lower limit (bound) value of $F^o(\eta)$. In the above-mentioned cases, a difference between the minimum and maximum values of $\eta$ is reduced.

If $\eta_{max} = 100$ is exemplarily given, the initial value of $\eta$ may be denoted by $(100+0)/2 = 50$. If the $F^o(\eta)$ calculation result satisfies $F^o(\eta) \leq 0$, $\eta_{max} = 50$ may be newly established or configured. In this case, $\eta$ may be $(50+0)/2 = 25$. Otherwise, if $F^o(\eta) \leq 0$ is not satisfied, $\eta_{max} = 50$ is established or configured, where $\eta$ is $(50+100)/2 = 75$.

Subsequently, the BS may calculate a difference between the minimum and maximum values of $\eta$ (S290). In other words, assuming that $|\eta_{max} - \eta_{min}|$ is within the range of a predetermined threshold value ($\delta$), the calculation process of the outer layer is ended. Otherwise, assuming that $|\eta_{max} - \eta_{min}|$ does not reach the range of the predetermined threshold value ($\delta$), the BS may gradually reduce a difference between the minimum and maximum values by continuously repeating the above-mentioned operations. $\delta$ obtained in step S290 may denote a predetermined accuracy, and may be associated with reliability of $F^o(\eta)$ calculated in step S250.

In other words, assuming that $|\eta_{max} - \eta_{min}|$ is within the range of $\delta$ in step S290, this means that optimal energy efficiency calculated in step S250 is considered reliable, and it is possible to form the optimal beamforming vector on the basis of $\{p_{j,k}^{opt,n}\} \cdot \{\beta_{j,k}^{opt,n}\}$, $\{\lambda_j^{opt,n}\}$ used in the $F^o(\eta)$ calculation process. Meanwhile, the threshold value $\delta$ indicating the predetermined accuracy may be decided by the BS and/or the UE, and may also be determined by the operator manipulation.

In other words, if it is determined that the optimal energy efficiency is achieved in step S290, the BS may generate the beamforming vector on the basis of the values $\beta_{m,n}$, $\lambda_j$, $c_{j,k}$, $p_{j,k}$ used in the calculation process. The BS may perform precoding so as to transmit data using the new beamforming vector, and may transmit the precoded signal.

Subsequently, the inner layer calculation process corresponding to some parts of the beamforming vector formation process needed when the BS achieves the optimal energy efficiency is shown in FIG. 3. The operations shown in FIG. 3 may indicate the calculation process corresponding to S250 in the outer layer calculation process of FIG. 2.

First, the BS may configure the initial value for inner layer calculation (S310). As the initial values, $n = 0$, $\beta_{j,k}^{(n)} = w_{j,k}$, $\lambda_j^{(n)} = \eta \zeta$, $p_{j,k}^{(n)} = P_j/K$ and $G^o(\{\beta_{j,k}^{(n)}\}, \{\lambda_j^{(n)}\}, \{p_{j,k}^{(n)}\}) = 0$ may be established or configured, respectively. $G_{(n)}^o = R_\Sigma^o - \eta \zeta \Sigma_{j,k} p_{j,k}$ may be established or configured in step S310. Subsequently, the BS may update $G^o$ on the basis of the initial value established or configured in step S310 (S330).

If $G^o$ is updated, the BS may configure $n = n+1$, and dummy variables $$u_{j,k}^{(n)} = \frac{\sqrt{g_{j,k,j,k}^o p_{j,k}^{(n)}}}{\sum_{m,n} g_{m,n,j,k}^o p_{m,n}^{(n)} + \sigma^2}$$

and $$s_{j,k}^{(n)} = \left(1 - u_{j,k}^{(n)} \sqrt{g_{j,k,j,k}^o p_{j,k}^{(n)}}\right)^{-1}$$

may be updated (S350). The BS may update $\beta_{j,k}^{(n)} = w_{j,k}(u_{j,k}^{(n)})^2 s_{j,k}^{(n)}$ on the basis of two updated dummy variables, and $G^o$ may be newly established or configured (S370).

If $G^o$ is established or configured, the BS may update $\lambda_j^{(n)}$ and $p_{j,k}^{(n)}$ (S390). As can be seen from Equation 35, the relationship between $\lambda_j = \eta \zeta + \mu_j$ and $$p_{j,k}^{opt} = \frac{w_{j,k} s_{j,k} u_{j,k} \sqrt{g_{j,k,j,k}^o}}{\sum_{m,n} w_{m,n} s_{m,n} u_{m,n}^2 g_{j,k,m,n}^o + \lambda_j^{opt}}$$

may be utilized to decide $\lambda_j^{(n)}$ and $p_{j,k}^{(n)}$ in step S390. In the case of $\mu_j^{opt}$ for deciding $\lambda_j^{(n)}$, if $\mu_j = 0$ satisfies $\rho_{k=1}^K p_{j,k} \leq P_j$, $_e \mu_j^{opt} = 0$ may be established or configured. If $\mu_j = 0$ does not satisfy $\Sigma_{k=1}^K p_{j,k} \leq P_j$, $\mu_j$ satisfying $\Sigma_{k=1}^K p_{j,k} = P_j$ may be decided according to the bisection method, resulting in $\mu_j^{opt}$.

Finally, the BS may determine whether $|G_{(n)}^o - G_{(n-1)}^o|$ is lower than a predetermined threshold value (S410). That is, the BS may compare the old value $G^o$ acquired before updating with the updated value $G^o$ (S410), and may determine whether the resultant value converges into the predetermined threshold value ($\delta$). If $|G^o(\{\beta_{j,k}^{(n)}\}, \{\lambda_j^{(n)}\}, \{p_{j,k}^{(n)}\}) - G^o(\{\beta_{j,k}^{(n-1)}\}, \{\lambda_j^{(n-1)}\}, \{p_{j,k}^{(n-1)}\})| \leq \delta$ is satisfied, the BS may terminate the inner layer calculation process. In this case, $G^o$ may be utilized for the outer layer calculation process. Meanwhile, if the above condition is not satisfied, the step S350 is performed again so that $G^o$ is updated. That is, the outer layer calculation process may be performed on the convergence value obtained by the inner layer calculation process. In the meantime, the threshold value $\delta$ to be used as a convergence target in step S410 may be different from the threshold value in step S290. $\delta$ in step S410 may be determined by the BS and/or the UE, and may also be determined by manipulation of the operator or user.

If the inner layer calculation process is completed, the BS may calculate $F^o(\eta)$ by adding a predetermined constant to the calculated value $G^o$, and $F^o(\eta)$ may denote $F^o(\eta)$ in step S250 of FIG. 2. That is, the inner layer calculation process may be a part of the outer layer calculation process. In order to calculate $F^o(\eta)$ on the basis of $G^o$, the constant value may be a fixed consumption power related component ($MNP_c + MP_0$).

The BS may acquire $\{p_{j,k}^{opt,n}\} \cdot \{\beta_{j,k}^{opt,n}\}$, $\{\lambda_j^{opt,n}\}$ needed to acquire the optimum energy efficiency according to the operations of FIGS. 2 and 3. Therefore, the BS may generate the beamforming vector using $\{p_{j,k}^{opt,n}\} \cdot \{\beta_{j,k}^{opt,n}\}$, $\{\lambda_j^{opt,n}\}$, and the beamforming vector may be generated on the basis of Equation 13. Subsequently, the BS may apply the generated beamforming vector to Tx data, resulting in formation of the Tx signal. The BS may transmit the generated Tx signal to the target UE or BS.

In the meantime, the signal transmission method according to the above-mentioned embodiments may calculate the beamforming vector only when the second-order statistics of the channel are changed after decision of $\{\beta_{j,k}^{opt}\}$, $\{p_{j,k}^{opt}\}$, $\{\lambda_j^{opt}\}$. Because the large scale fading of the channel in a general wireless environment is changed per second and the small scale fading is changed per millsecond, there is a high difference in algorithm execution frequency between the signal transmission method of the present invention and the conventional method. In addition, whereas the conventional method uses the vector $\{v_{j,k}\}$ as a variable during the inner layer calculation process, the proposed scheme of the present invention may use the scalar value $\{p_{j,k}\}$ as a variable. Therefore, complexity of the inner layer calculation process according to the proposed scheme may be reduced from $O(M^2K^2N^3)$ to $O(M^2K^2)$. In conclusion, the proposed method can greatly improve calculation complexity during the beamforming vector formation process.

The term "second-order statistics" may indicate the occurrence of a situation change generated at intervals of several seconds. For example, such situation change may include a first case in which a covariance matrix of the channel measured by the UE is changed by a predetermined level or greater, a second case in which SNR measured by the UE is changed by a predetermined level or greater, and a third case in which the UE moves by a predetermined distance or longer. That is, the change of the second order statistics may indicate the channel characteristics related to long term fading.

In addition, the double-layered optimization method of FIGS. 2 and 3 may be initiated by the beamforming vector update request message of the UE. That is, the UE may transmit the beamforming vector update request message to the BS according to change of the second-order statistics of the channel measured by the UE. The beamforming vector update request message may allow the BS to newly perform the precoding process such that formation of the new beamforming vector may be requested. The BS may configure the initial value according to reception of the beamforming vector update request message, and may form a new beamforming vector through the outer layer calculation process and the inner layer calculation process, such that the BS performs data precoding and transmits the signal to the UE.

FIG. 4 illustrates the improved effects obtained when the proposed signal transmission method is used. FIG. 4(a) illustrates the system parameter in the wireless environment to which the proposed signal transmission method is applied, and FIG. 4(b) illustrates the result confirmed through simulation in the wireless environment system (three hexagonal cell environments) of FIG. 4(a). FIG. 4(b) illustrates the confirmation result obtained through Monte-Carlo simulation.

The graph of FIG. 4(b) illustrates the convergence speed of the inner layer calculation process for use in the beamforming vector calculation process of the present invention. Three curves shown in FIG. 4(b) may illustrate the algorithm convergence speed of the inner layer calculation process with respect to the respective user drop cases, it can be confirmed that the resultant value is rapidly converged through about 20 iterative calculations.

Figure 5:
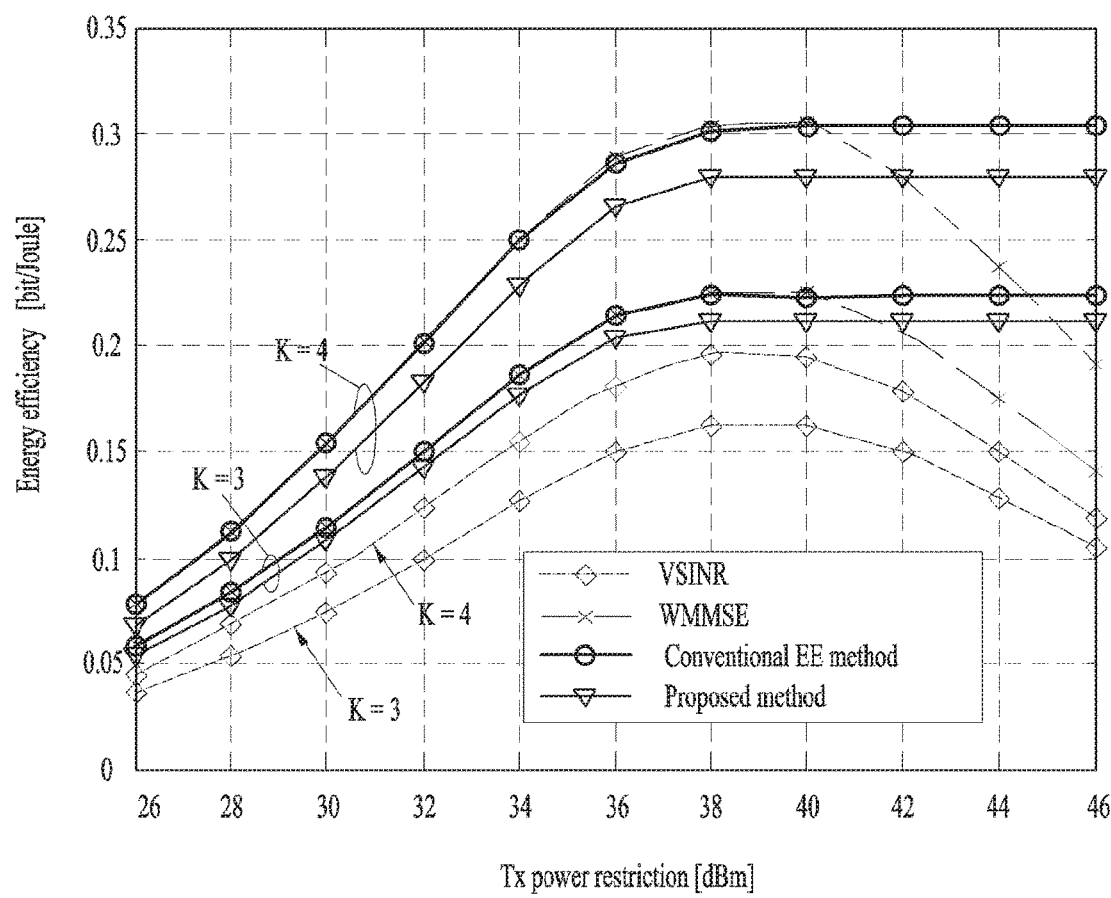
FIG. 5 is a conceptual diagram illustrating change in energy efficiency according to the proposed signal transmission method.

FIG. 5 illustrates the energy efficiency change according to the proposed signal transmission method.

FIG. 5 illustrates the mean energy efficiency when the number (K) of UEs is 3 or 4. Although the embodiment has lower calculation complexity than the conventional art, it can be recognized that the degree of performance deterioration shown in FIG. 5 is little.

Figure 6:
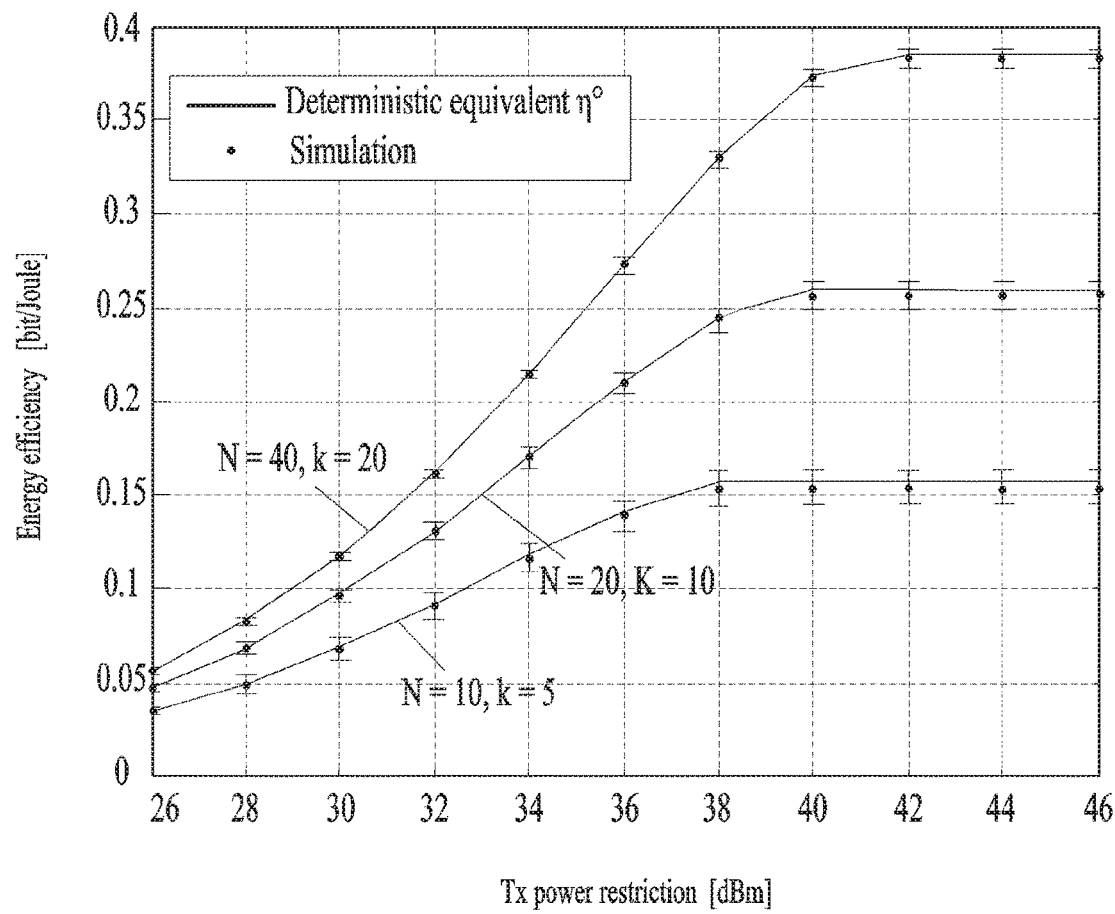
FIG. 6 is a conceptual diagram illustrating change in energy efficiency according to the proposed signal transmission method.

FIG. 6 illustrates the energy efficiency change according to the proposed signal transmission method.

FIG. 6 illustrates the comparison result between the simulated mean energy efficiency and the deterministic equivalent value obtained by the proposed method. Bars located above and below the dot may indicate standard deviation of the deterministic equivalency according to the proposed method, and it can be recognized that the result of the proposed method is an estimation value very similar to the actual energy efficiency.

Figure 7:
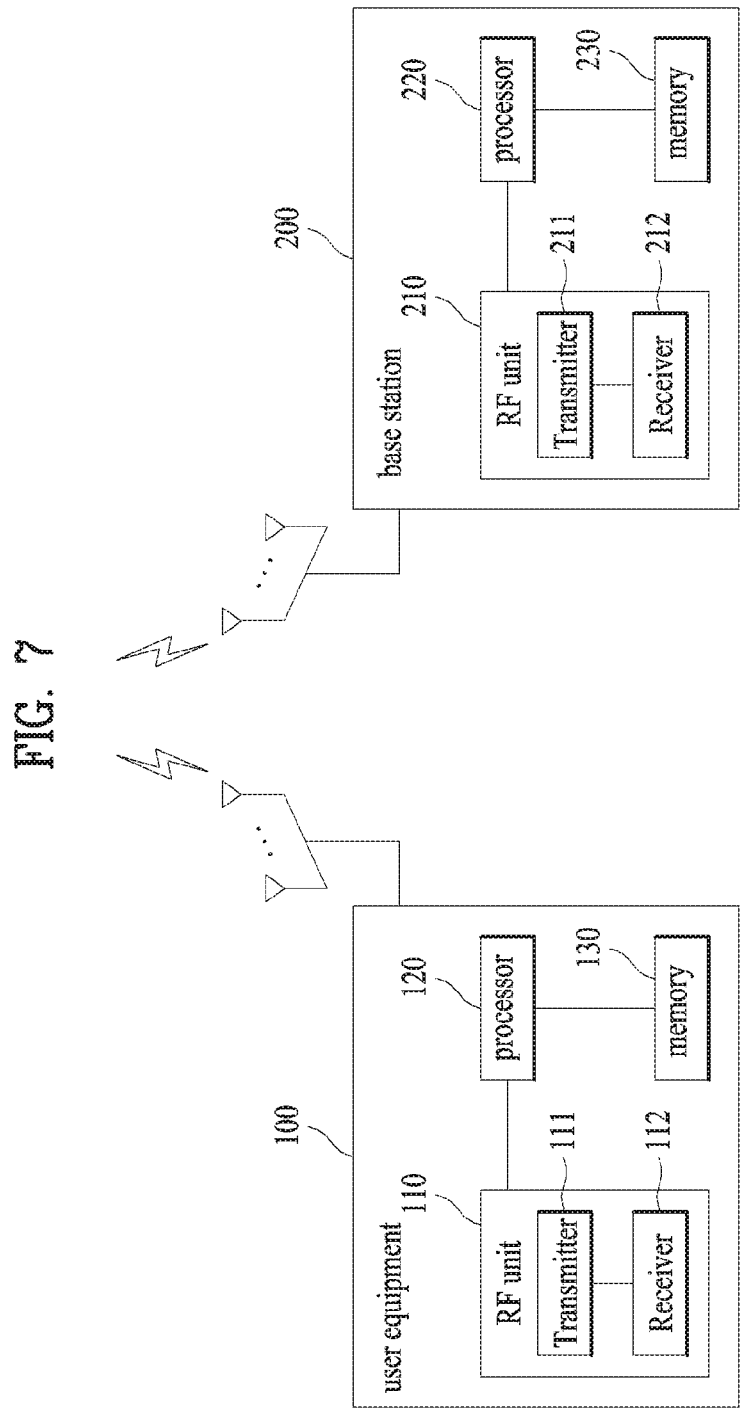
FIG. 7 is a block diagram illustrating a base station (BS) and a user equipment (UE) according to an embodiment of the present invention.

FIG. 7 is a block diagram of a structure of the UE 100 and the BS 200 according to an embodiment of the present invention.

In FIG. 7, the UE 100 and the BS 200 may include radio frequency (RF) units 110 and 210, processors 120 and 220, and memories 130 and 230, respectively. Although FIG. 22 illustrates a 1:1 communication environment between the UE 100 and the BS 200, a communication environment between a plurality of UEs and the BS 200 can also be established or configured. In addition, the BS 200 of FIG. 22 can be applied to both a macro cell BS and a small cell BS.

The RF units 110 and 210 may include transmitters 112 and 212 and receivers 114 and 214, respectively. The transmitter and 112 and the receiver 114 of the UE 100 may be configured to transmit and receive signals to and from the BS 200 and other UEs and the processor 120 may be functionally connected to the transmitter 112 and the receiver 114 to control a process of transmitting and receiving signals to and from other devices by the transmitter 112 and the receiver 114. The processor 120 performs various processing processes on signals to be transmitted and then transmits the processed signals to the transmitter 112 and performs processing on the signals received by the receiver 114.

As necessary, the processor 120 may store information contained in exchanged message in the memory 130. Based on this structure, the UE 100 can perform various methods according to the aforementioned embodiments of the present invention.

The transmitter 212 and the receiver 214 of the BS 200 may be configured to transmit and receive signals to and from other BSs and UEs and the processor 220 may be functionally connected to the transmitter 212 and the receiver 214 to control a process of transmitting and receiving signals to and from other devices by the transmitter 212 and the receiver 214. The processor 220 performs various processing processes on signals to be transmitted and then transmits the processed signals to the transmitter 212 and performs processing on the signals received by the receiver 214.

As necessary, the processor 220 may store information contained in exchanged messages in the memory 230. Based on this structure, the BS 200 can perform various methods according to the aforementioned embodiments of the present invention.

The processors 120 and 220 of the UE 100 and the BS 200 requests (e.g., control, manipulate, manage, etc.) operations of the UE 100 and the BS 200, respectively. The processors 120 and 220 may be connected to the memories 130 and 230 for storing program code and data, respectively. The memories 130 and 230 may be connected to the processors 120 and 220 to store operating system (OS), an application, and general files.

The processors 120 and 220 according to the present invention can also be called controllers, microcontrollers, microprocessors, microcomputers, etc. The processors 120 and 220 may be embodied in the form of hardware, firmware, software, or a combination thereof. When an embodiment of the present invention is embodied using hardware, the processors 120 and 220 may include application specific integrated circuits (ASICs), digital signal processors (DSPs), digital signal processing devices (DSPDs), programmable logic devices (PLDs), field programmable gate arrays (FPGAs), or the like which is configured to embody the present invention.

The embodiments of the present invention may be written as computer programs and can be implemented in general-use digital computers that execute the programs using a computer readable recording medium. In addition, a structure of data used in the above-described method may be recorded in a computer readable recording medium through various methods. Program storage devices used for description of a storage device containing an executable computer code for execution of the various methods according to the present invention is not understood as temporary objects such as carrier waves or signals. Examples of the computer readable recording medium include magnetic storage media (e.g., ROMs, floppy disks, hard disks, etc.) and optical recording media (e.g., CD-ROMs, or DVDs).

It will be apparent to those skilled in the art that various modifications and variations can be made in the present invention without departing from the spirit or scope of the invention. Therefore, the above embodiments should be construed in all aspects as illustrative and not restrictive. The scope of the invention should be determined by the appended claims and their legal equivalents, not by the above description, and all changes coming within the meaning and equivalency range of the appended claims are intended to be embraced therein. Accordingly, the exemplary embodiments of the present invention are duly considered in view of illustrative purpose rather than restriction thereof. It is also construed that a technical range of the invention is not restricted to the above detailed description but is defined in the appended claims and equivalents thereof, within which all differences are included in the present invention.

What is claimed is:

1. A method for transmitting a signal through a plurality of antennas in a wireless communication system supporting Multiple Input Single Output (MISO), the method performed by a base station (BS) and comprising:
    configuring an initial value for generating a beamforming vector for precoding;
    performing an outer-layer calculation process to determine whether accuracy of energy efficiency calculated based on the configured initial value satisfies a first threshold range, the calculation process performed during a dual-layer calculation process for maximizing energy efficiency of the BS;
    wherein a deterministic equivalency of a first channel gain matrix used in the outer-layer calculation process is determined using an inner-layer calculation process to calculate the first channel gain matrix that satisfies a difference between the calculated first channel gain matrix and a second channel gain matrix calculated by the inner-layer calculation process, the deterministic equivalency equal to or smaller than a second threshold range;
    generating the beamforming vector based on values used in the outer-layer calculation process and the inner-layer calculation process when the calculated accuracy of energy efficiency satisfies the first threshold range;
    generating a transmission signal by precoding data using the generated beamforming vector; and
    transmitting the generated transmission signal.

2. The method of claim 1, further comprising:
    receiving a beamforming vector update request message from a user equipment (UE), the message requesting execution of a new precoding process; and
    configuring the initial value according to the received beamforming vector update request message.

3. The method of claim 2, wherein the beamforming vector update request message is received when second-order statistics of a channel measured by the UE are changed.

4. The method of claim 3, wherein the second-order statistics are changed when a covariance matrix of the measured channel is changed, Signal to Interference plus Noise Ratio, measured by the UE is changed, or the UE moves by at least a predetermined distance.

5. The method of claim 1, wherein the first threshold range and the second threshold range are determined by the BS, by a user equipment communicating with the BS, or by a user.

6. The method of claim 1, wherein the outer-layer calculation process or the inner layer calculation process is repeatedly performed when the calculated accuracy of energy efficiency does not satisfy the first threshold range.

7. A base station (BS) for transmitting a signal through a plurality of antennas in a wireless communication system supporting Multiple Input Single Output (MISO), the BS comprising:
    a transmitter configured to transmit signals;
    a receiver configured to receive signals; and
    a processor connected to the transmitter and the receiver, the processor configured to:
    configure an initial value for generating a beamforming vector for precoding;
    perform an outer-layer calculation process to determine whether accuracy of energy efficiency calculated based on the configured initial value satisfies a first threshold range, the calculation process performed during a dual-layer calculation process for maximizing energy efficiency of the BS;
    wherein a deterministic equivalency of a first channel gain matrix used in the outer-layer calculation process is determined using an inner-layer calculation process to calculate the first channel gain matrix that satisfies a difference between the calculated first channel gain matrix and a second channel gain matrix calculated by the inner-layer calculation process, the deterministic equivalency equal to or smaller than a second threshold range;
    generate the beamforming vector based on values used in the outer-layer calculation process and the inner-layer calculation process when the calculated accuracy of energy efficiency satisfies the first threshold value range;
    generate a transmission signal by precoding data using the generated beamforming vector, and
    control the transmitted to transmit the generated transmission signal.

8. The base station (BS) of claim 7, wherein the processor is further configured to:
    control the receiver to receive a beamforming vector update request message from a user equipment (UE), the message requesting execution of a new precoding process; and
    configure the initial value according to the received beamforming vector update request message.

9. The BS of claim 8, wherein the beamforming vector update request message is received when second-order statistics of a channel measured by the user equipment (UE) are changed.

10. The BS of claim 9, wherein the second-order statistics are changed when a covariance matrix of the channel is changed, a Signal to Interference plus Noise Ratio, measured by the UE is changed, or the UE moves by at least a predetermined distance.

11. The BS of claim 7, wherein the first threshold range and the second threshold range are determined by the BS, by a user equipment communicating with the BS, or by a user.

12. The BS of claim 7, wherein the outer-layer calculation process or the inner layer calculation process is repeatedly performed when the calculated accuracy of energy efficiency does not satisfy the first threshold range.

* * * * *